UNITED STATES PATENT OFFICE.

WILHELM MAJERT, OF GRUENAU, AND ALBRECHT SCHMIDT, OF BERLIN, ASSIGNORS TO THE CHEMISCHE FABRIK AUF ACTIEN, (VORMALS E. SCHERING,) OF BERLIN, GERMANY.

PIPERAZIN.

SPECIFICATION forming part of Letters Patent No. 511,303, dated December 19, 1893.

Application filed September 19, 1893. Serial No. 485,893. (No specimens.)

*To all whom it may concern:*

Be it known that we, WILHELM MAJERT, of Gruenau, and ALBRECHT SCHMIDT, of Berlin, Prussia, Germany, subjects of the King of Prussia, have invented new and useful Improvements in Piperazin, of which the following is a specification.

This invention relates to a new composition of matter and consists of anhydrous piperazin as a new substance.

We have produced anhydrous piperazin, being the pure base, which substance differs in many important particulars from piperazin compounds.

The anhydrous piperazin corresponds with the formula $C_4H_{10}N_2$. It is ordinarily a yellowish crystalline substance, having a strong smell resembling ammonia, but can be refined by sublimation so as to be colorless. Its melting point ranges from 104° to 112° centigrade, being slightly higher for large quantities than for small quantities. It is very hygroscopic, does not crystallize out of aqueous solutions, fumes when exposed to the air, absorbs rapidly carbonic acid and has strong caustic properties. It is a powerful solvent of uric acid and forms invariably with uric acid, a neutral, easily soluble salt, even when the uric acid is present in excess. It is a strong solvent of albuminous substances or formations, for instance those which cement together the particles or layers which form the stones in the bladder.

Anhydrous piperazin can be easily distinguished from the substance called by Hoffmann, diethylendiamin (*Royal Society Proc.*, X, 224), and which was a liquid boiling at 170° centigrade. This liquid contained vinyl and other combinations, some of which are poisonous. It can also be readily distinguished from the substance called by Ladenburg aethylenimin (*Berichte*, vol. 21, p. 758) which was similar to porcelain in appearance and melted at 159° to 163° centigrade and was therefore a carbonate. This substance does not dissolve albuminous formations and has only a small dissolving effect upon uric acid. It can also be readily distinguished from Schreiner's spermin which was known only as a hydrochlorid or phosphate and was never produced artificially. It can also be readily distinguished from the hydrochlorid, sulfate and phosphate of piperazin, mentioned in Letters Patent of the United States No. 471,520, dated March 22, 1892, granted to Wilhelm Majert, which salts do not dissolve uric acid.

The anhydrous piperazin cannot very well be employed in its solid form as a therapeutic agent by reason of its caustic properties, but it can be dissolved in water and be applied in that form.

From one half to one gram of anhydrous piperazin dissolved in a suitable amount of water is an approximate dose.

The anhydrous piperazin can be produced out of piperazin hydrate by mixing the latter with an excess of a solid alkali hydrate and distilling the mixture, and repeating this operation several times, then heating the distillate in a closed vessel to about 120° centigrade, with an alkali-hydroxid or barium oxid, and finally distilling the mixture over sodium.

We claim as our invention—

The herein described new composition of matter, anhydrous piperazin, being a crystalline yellowish to colorless substance, having caustic properties, having its melting point at from 104° to 112° centigrade, having a smell resembling ammonia, corresponding to the formula $C_4H_{10}N_2$, and being a strong solvent of uric acid, substantially as set forth.

Witness our hands this 1st day of August, 1893.

WILHELM MAJERT.
ALBRECHT SCHMIDT.

Witnesses:
CARL SPOHN,
CARL SPIEGEL.